United States Patent
Horng

[11] Patent Number: 6,110,408
[45] Date of Patent: Aug. 29, 2000

[54] METHOD OF MAKING A MATERIAL ASSEMBLY OF A WEAR PROOF ELEMENT USED IN A ROTARY AXIS STRUCTURE

[76] Inventor: Chin Fu Horng, No. 9, Alley 90, Fu Hsin Rd., Lu Chou City, Taipei Hsien, Taiwan

[21] Appl. No.: 09/160,097

[22] Filed: Sep. 25, 1998

[51] Int. Cl.⁷ ........................................ B29C 45/73
[52] U.S. Cl. .................. 264/328.16; 264/328.17; 264/331.15; 264/331.19; 264/331.21
[58] Field of Search ....................... 264/109, 122, 264/328.1, 328.14, 328.16, 328.17, 331.15, 331.17, 331.19, 331.21, 125, 126, 127

[56] References Cited

U.S. PATENT DOCUMENTS

| | | | |
|---|---|---|---|
| 4,042,747 | 8/1977 | Breton et al. ............................ | 264/122 |
| 4,084,929 | 4/1978 | McGarry, Sr. et al. .................. | 425/169 |
| 4,085,184 | 4/1978 | Jules et al. .............................. | 264/219 |
| 4,134,842 | 1/1979 | Orkin et al. ............................. | 264/242 |

*Primary Examiner*—Jill L. Heitbrink
*Assistant Examiner*—Kenneth M. Jones
*Attorney, Agent, or Firm*—Rosenberg, Klein & Lee

[57] ABSTRACT

A material assembly of a wear proof element used in a rotary axis structure and the method thereof, wherein the wear proof element used in a rotary axis structure comprises Nylon, glass fiber and Teflon of a predetermined ratio. After heating, drying, and injection to these material, a wear proof element used in a rotary axis structure. Thereby, a wear proof element with an adjustable twisting force, wear proof ability, and without adding lubricate oil is obtained. Also, the cost is reduced and lifetime thereof is prolonged.

4 Claims, 2 Drawing Sheets

METHOD OF MAKING A MATERIAL ASSEMBLY OF A WEAR PROOF ELEMENT USED IN A ROTARY AXIS STRUCTURE

BACKGROUND OF THE INVENTION

The present invention relates to a material assembly of a wear proof element and the method thereof, especial to wear proof element may be used in a rotary axis structure. The wear proof element of the present invention has an adjustable twisting force, wear proof property, and has not necessary to add any lubricate oil.

SUMMARY OF THE INVENTION

The main frame and liquid crystal display of a prior art notebook are installed with a rotary axis structure for connected therebetween. Thereby, the liquid crystal display may be opened or closed through the rotary axis structure. The rotary axis structure needs to be installed with a wear proof element therewithin for providing a twisting force by friction force therebetween. However, the prior art wear proof element of a rotary as structure are made by iron pieces or other metal materials, thus another lubricating oil is necessary to add into the structure. Thus oil dirt are easy to generate. This further destroys the design of the plastic housing of a notebook.

Therefore, the aforementioned wear proof element of a rotary axis structure has some defects in practical applications, which is necessary to be further improved.

SUMMARY OF THE INVENTION

Accordingly, the object of the present invention is to provide a material assembly of a wear proof element used in a rotary axis structure and the method thereof, wherein the wear proof element is formed by Nylon (nylon), glass fiber and Teflon (polytetrafluoroethylene) with a predetermined ratio. The wear proof element used in a rotary axis structure may be used in a rotary axis structure, in place of conventional metal wear proof element used in a rotary axis structure. Thereby, a wear proof element with an adjustable twisting force, wear proof property, and without adding lubricate oil is obtained. Also, the cost is reduced, and lifetime thereof is prolonged.

The present invention will be better understood and its numerous objects and advantages will become apparent to those skilled in the art by referencing to the following drawings in which:

DETAILED DESCRIPTION OF THE PREFERRED EMBODIMENT

The present invention is related to material assembly of a wear proof element used in a rotary axis structure and the method thereof, wherein the wear proof element used in a rotary axis structure comprises the following components:

(a) 45~65 wt % (weight percentage) of Nylon
(b) 25~35 wt % of glass fiber; and
(c) 10~20 wt % of Teflon The wear proof element used in a rotary axis structure is formed by heating the Nylon in (a), glass fiber in (b) and Teflon in (c), and then injecting molding the heating components.

Figure 1:
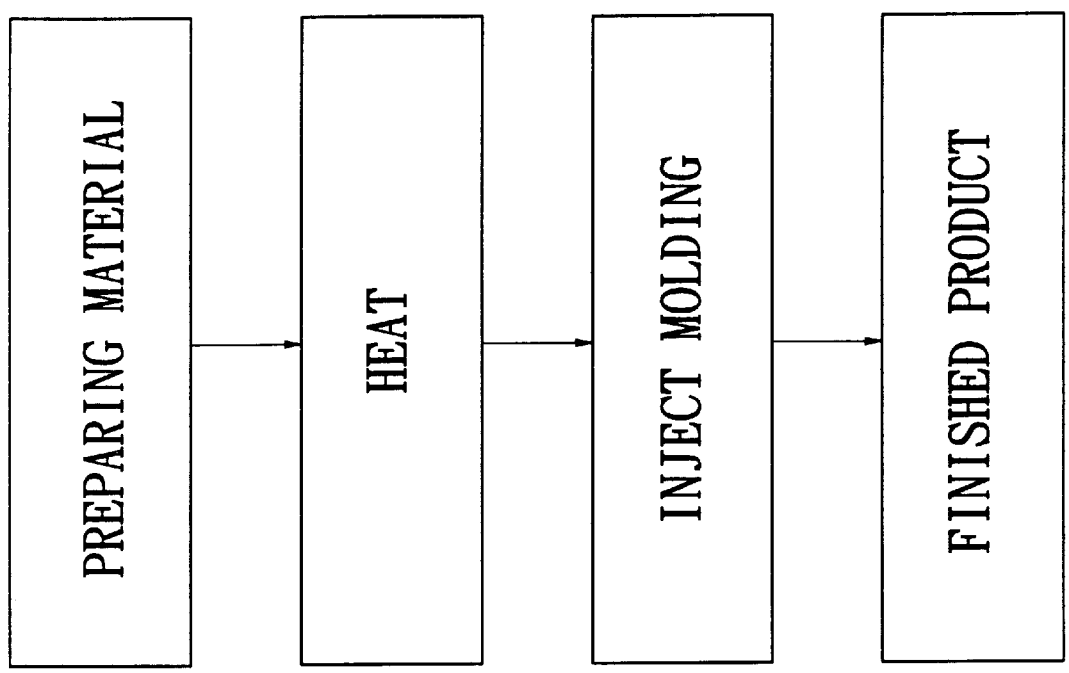
FIG. 1 is the flow diagram for manufacturing the present invention.

Referring to FIG. 1, the flow diagram of the present invention is shown, as shown in the figure, the method for manufacturing the wear proof element used in a rotary axis structure of the present invention including the following steps:

(1) Repairing material: The material is (a) 45~65 wt % (weight percentage) of Nylon, (b) 25~35 wt % of glass fiber; and (c) 10~20 wt % of Teflon.

Figure 2:
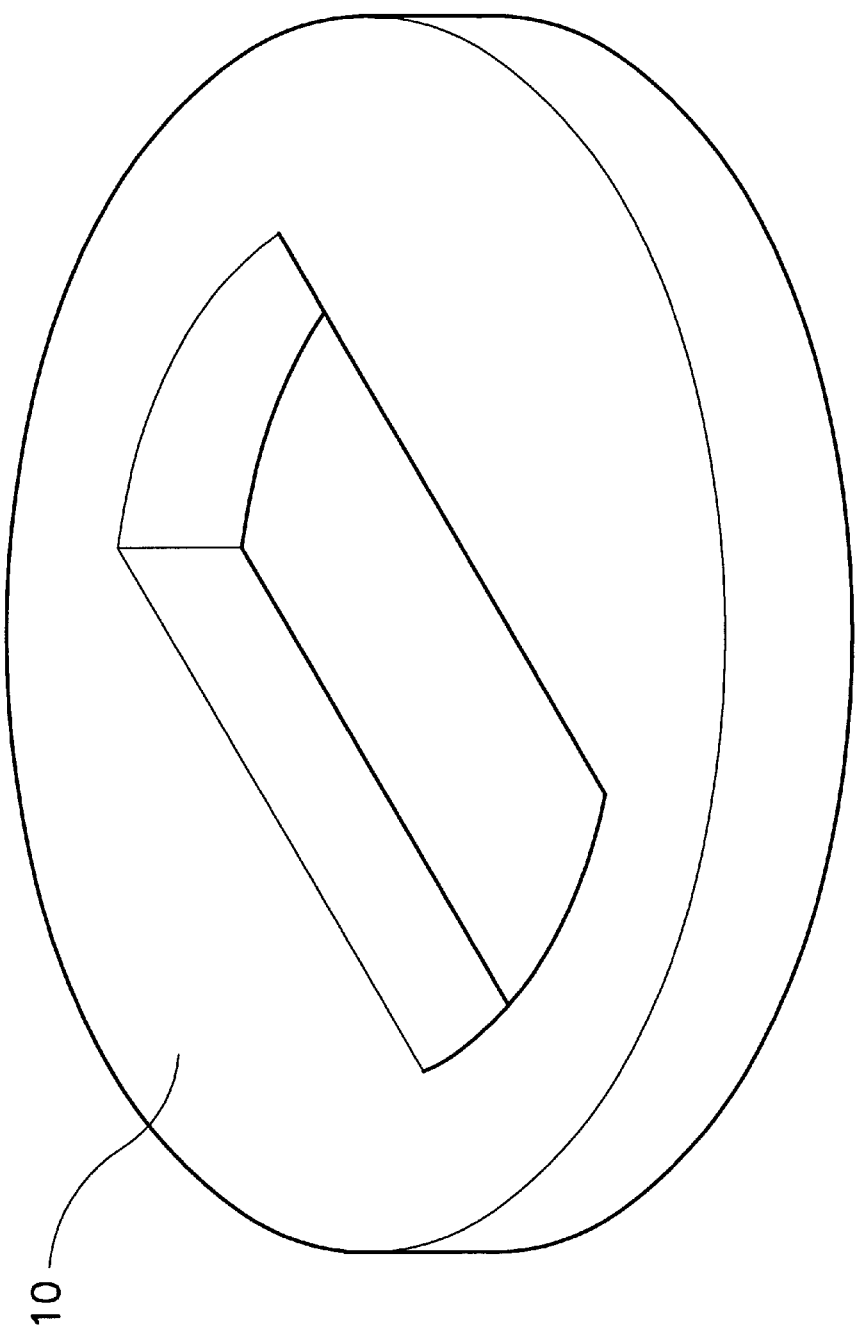
FIG. 2 is a perspective view of the embodiment of the wear proof element according to the present invention.

(2) Heating: heating the Nylon, glass fiber and Teflon in step (a) in a temperature of 90~130° C. for 3~6 hours; and (3) Injecting molding: Melting the heated material of step (2) in injecting molding material tube to 230~290° C. so to become a fluid, and then the material is injected into a mold. After cooling, the desired wear proof element is generated, as shown in FIG. 2. However, the shape and structure of the wear proof element have not been confined, which may be varied according to the requirement of users.

The wear proof element used in a rotary axis structure of the present invention has the property of wear proof, adjustable twisting force, and lubricated oil is necessary to add into the wear proof element. It is analyzed in the following:

(1) Teflon is a material with preferred wear proof property. If it is used in a rotary axis structure, the wear proof property thereof will better than the conventional rotary axis structure made of iron.

(2) Nylon is a kind of plastic material and has the general property of plastic (elasticity and heat expansion and cool contraction), thus the compression twisting force thereof may be adjusted according to the requirement of the wear proof element. Also, since Nylon is a petrochemical material with grease, as it is rotated with the rotary axis structure, the grease may be released to lubricating the resisting force caused by the friction of rotation. Thus, the present invention is preferred than the conventional iron rotary axis structure in which another oil is necessary to add therein (this is probable to induce the draining of oil).

(3) The glass fiber has a preferred hardness and stability. Good hardness may prevent that the glass fiber is melted due to too large expansion by heating or contraction by cooling. A high stability may cause the size fixedness dining manufacturing process.

(4) The properties of the Nylon, glass fiber and Teflon processed by the aforementioned steps may be employed in the rotary axis structure, instead of the prior art in which the rotary axis structure is made by metals. Thus the cost is low and the lifetime is prolonged.

Accordingly, the rotary axis structure of the present invention has improved the conventional metal rotary axis structure and has preferred properties. Although the present invention has been described using specified embodiment, the examples are meant to be illustrative and not restrictive. It is clear that many other variations would be possible without departing from the basic approach, demonstrated in the present invention.

What is claimed is:

1. A method for manufacturing a wear proof element used in a rotary axis structure including the following steps of:

(1) preparing a material composition containing nylon, glass fibers, and polytetrafluoroethylene in a predetermined ratio;

(2) heating the material composition from step (1) to a predetermined temperature; and (3) placing the heated material composition from step (2) in an injecting molding material tube to become a fluid, and then injecting the fluid into a mold to produce the wear proof element after cooling.

2. The method as claimed in claim 1, wherein the step of preparing includes the step of combining nylon in an amount ranging from 45 to 65 wt % of the material composition, glass fiber in an amount ranging from 25 to 35 wt % of the material composition, and polytetrafluoroethylene in an amount ranging from 10 to 20 wt % of the material composition.

3. The method as claimed in claim 1, wherein the step of heating the material composition to a predetermined temperature includes the step of heating the material composition to a temperature within a range of 90~130° C. for 3~6 hours.

4. The method as claimed in claim 1, wherein the step of placing the heated material composition in the injecting molding material tube includes the step of heating the material injecting tube to a temperature within a range of 230~290° C.

* * * * *